April 27, 1937.  LE. ROY C. HOEFER  2,078,798
FLY CASTING FISHING LURE
Filed Aug. 31, 1936
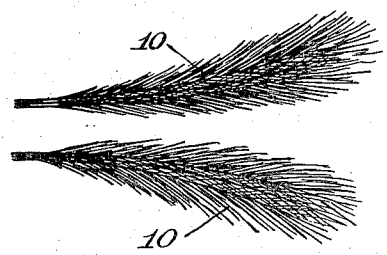
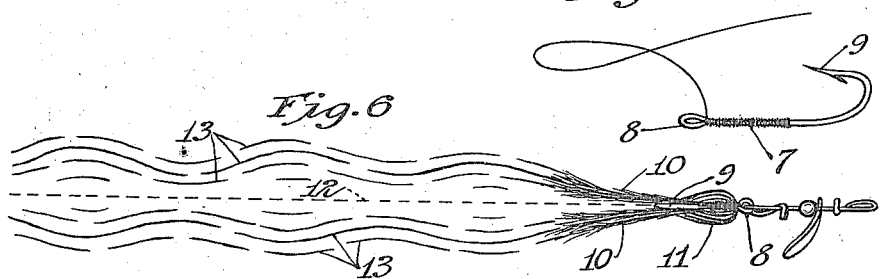
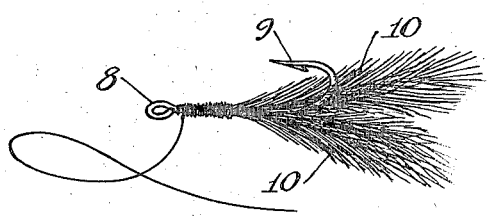
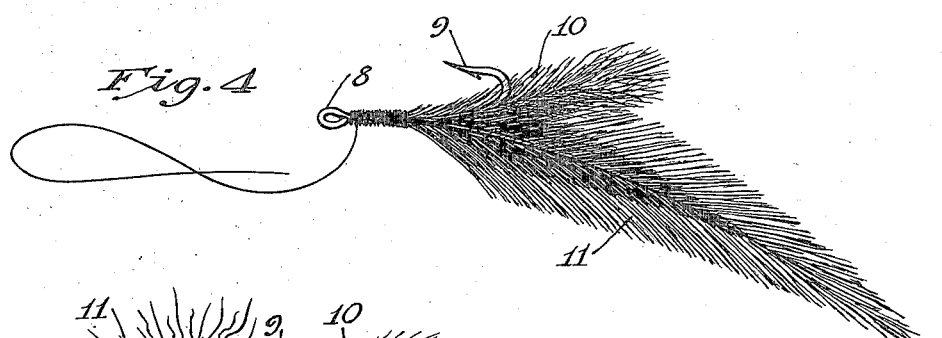
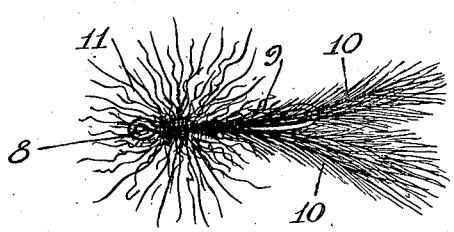
Inventor
Le Roy C. Hoefer
By Williamson & Williamson
Attorneys Patented Apr. 27, 1937

2,078,798

UNITED STATES PATENT OFFICE 2,078,798

FLY CASTING FISHING LURE

Le Roy C. Hoefer, Minneapolis, Minn.

Application August 31, 1936, Serial No. 98,658

4 Claims. (Cl. 43—48)

This invention relates to fishing lures and particularly to feathered lures adapted to be drawn through the water.

It is an object of my invention to provide a simple and highly efficient fishing lure composed principally of feathers and so constructed as to have animation when drawn through the water.

It is further an object to provide a simple and improved method for constructing a fishing lure of the class above described.

More specifically it is an object to provide a feathered fishing lure having side or wing portions each constructed from a series of feathers and so related as to resiliently vibrate when drawn through the water, simulating the action of a live bait.

While efficient surface lures may be made embodying my said invention, usually in such cases they are constructed to resemble insects or bugs, my invention is particularly applicable for below surface fishing, in which case the fibers of the feathers extend longitudinally and rearwardly of the lure and the side or wing sections vibrate symmetrically simulating the appearance of a swimming minnow or other live bait when the lure is drawn through the water even at relatively slow speed.

The foregoing and other objects will be more fully apparent from the following description made in connection with the accompanying drawing wherein like reference characters refer to similar parts throughout the several views and in which:—

Fig. 1 is a perspective view illustrating the manner in which a plurality of feathers are arranged to form the wings of my improved fly, Fig. 2 is a perspective view illustrating the step of my improved method in preparing a hook for the attachment of the wings.

Fig. 3 is a perspective view illustrating the step of my improved method in which the wing elements are attached to the shank of the hook.

Fig. 4 is a perspective view illustrating the attachment of a streamer feather which is utilized to produce the hackle on a fly, Fig. 5 is a perspective view illustrating the completed fly after the streamer has been wound about the shank of the hook to form the hackle, and Fig. 6 is a diagrammatic top plan view indicating by dotted lines the movement of the hook and feather tips of the lure as the same has cause to move through the water.

In making my improved fish lures, a suitable hook is utilized having the usual straight shank 7, the attachment eye 8 and the barb 9. Unless the hook utilized has a roughened knurled shank, I prefer to prepare the shank to furnish an irregular or roughened attachment surface by winding a thin thread spirally upon the shank and making several hitches or other knots to prevent unwinding of the thread, as is illustrated in Fig. 2. In constructing the wing or side members of my improved fly, I utilize individual feathers usually from five to fifteen for each wing and in accordance with my invention lay these feathers one upon the other with the shafts of the feathers overlying one another and with the natural curves in the shafts extending similarly and in parallel relation for each wing (see Fig. 1). I prefer to utilize rooster neck feathers for the wings of my fly as they are strong and have requisite resiliency but of course other types of feathers may be used all within the scope of my invention.

Next, the feathers, arranged as shown in Fig. 1 to form wing members 10, are carefully held with the bases of the feather shafts extending to approximately the eye of the hook and each of the two series of feathers is disposed at one side of the shank of the hook and the two series are so arranged that the feather shafts of the wings diverge oppositely and outwardly leaving the tail or fibers of the feathers disposed in rather widely spaced relation as shown in Fig. 3. The two series of feathers being so held upon the shank, are secured thereto by carefully winding a fine thread about the feather shafts at the bases and securing this thread by several hitches or other knots after it is sufficiently wound about the hook shank.

If a hackle is desired, an elongated feather or streamer 11 is secured by thread winding at the base of its shaft to the forward winding of the wing feathers as is illustrated in Fig. 4. The hackle is then formed by winding the free portion of the streamer spirally about the attached ends of the wing feather shafts, the fibers of the streamer projecting outwardly as is clearly illustrated in Fig. 5.

The finished fly or lure has the wing portions 10 concentrically diverging from the attached base ends of the feather shafts, the wings being more or less separated throughout their free lengths and extending in width sufficiently to conceal most of the curved portion of the hook. The shafts of the carefully arranged series of feathers constituting the two wings have considerable resiliency and when the lure is drawn through the water eye foremost, the varying resistance of the water causes the two diverging sets of wing feathers to vibrate, closely simulating the swimming action or movement of a live bait and readily attracting game fish.

In Fig. 6 an embodiment of the invention is shown as it appears when drawn through the water, the straight dotted line 12 showing the straight line travel of the hook and the wave like dotted lines 13 indicating the travel and vibrating movement and feather tips of the wing sections. It will be noted that with the resistance of the water the lure when elongated wing sections are utilized resembles to a considerable extent a minnow or small fish, the vibration of the wing sections simulating the fin or body action of a minnow as the same swims through the water.

Remarkable results have been obtained with my improved lures made in accordance with the invention disclosed herein. In many instances where comparative tests have been made on various fish, comparing the success of other casting lures and flies of the type where the tail feathers at both sides of the hook merge into more or less a single plane, my lures have brought large catches when conventional lures now extensively used have failed to catch a single fish. The preparation of the hook for receiving the feathers is important in that it enables the carefully arranged series of wing feathers to be correctly attached and prevents subsequent oscilating of the shafts of said feathers when the fly is used. The rigidly secured base portions of the feathers attached to the rigid hook shaft offer a base of resistance whereby the resilient free portions of the shafts may vibrate freely due to the varying resistance of the water when the fly is dragged therethrough.

It will, of course, be understood that various changes may be made in the form, detail and arrangement of parts without departing from the scope of my invention.

Further it will be seen that I have provided a simple and highly efficient method for making improved fly casting lures which simulate by vibrative action the flapping of an insect's wings.

What is claimed is:—

1. A fishing lure comprising a hook and a pair of wings attached at their forward ends to the shank of said hook and at substantially opposite sides of said shank, and diverging from their attached portions to their free extremities, said wings being constructed from a plurality of small feathers having resilient feather shafts, the feathers of each wing being laid one over the other with the feather shafts extending similarly, the rear ends of said wings being spaced some distance apart and being also spaced from said hook, whereby when said lure is drawn through the water said wings will vibrate.

2. A fishing lure comprising a hook and a pair of wings attached to the shank of said hook, said wings each comprising a plurality of small feathers having resilient feather shafts, said feathers being laid one upon the other with said shafts also overlaid and with the natural curves of said feathers extending similarly, the forward ends or bases of the feather shafts of the respective wings being secured to the shank of said hook by winding a thread about said shafts and said hook shank, said wings then diverging rearwardly from said hook and the free end portions being spaced a substantial distance apart and being also spaced from said hook with the curves of said feather shafts extending oppositely and outwardly, whereby when said lure is drawn through the water said wings will vibrate.

3. The method of making a fishing lure which consists in preparing a pair of wings by carefully laying a plurality of feathers one upon the other for each wing, with the shafts of said feathers extending similarly and having their base portions disposed in juxta-position and securing said wings to opposite sides of a hook shank by winding a wrapping about the base portions of said feather shafts with the natural curves of said feather shafts of the two wings diverging outwardly and oppositely from said hook shank.

4. The method of building a fishing lure upon a conventional fishing hook which consists in preparing a pair of wings by carefully laying out a plurality of feathers one upon the other for each wing with the shafts of said feathers extending similarly and with the base portions of said shafts disposed in juxta-position, forming a roughened peripheral surface on the shaft of said hook for attachment of said wing and securing said wing to opposite sides of said roughened portion by winding a wrapping about the base portion of said feather shafts, while said wings are held against said shank with the natural curves of said feathers of the two wings diverging outwardly and oppositely from front to rear.

LE ROY C. HOEFER.